Aug. 7, 1951  H. J. FANGER  2,563,107
METHOD OF FORMING WELDED CONNECTIONS AND MEANS THEREFOR
Filed Nov. 30, 1949
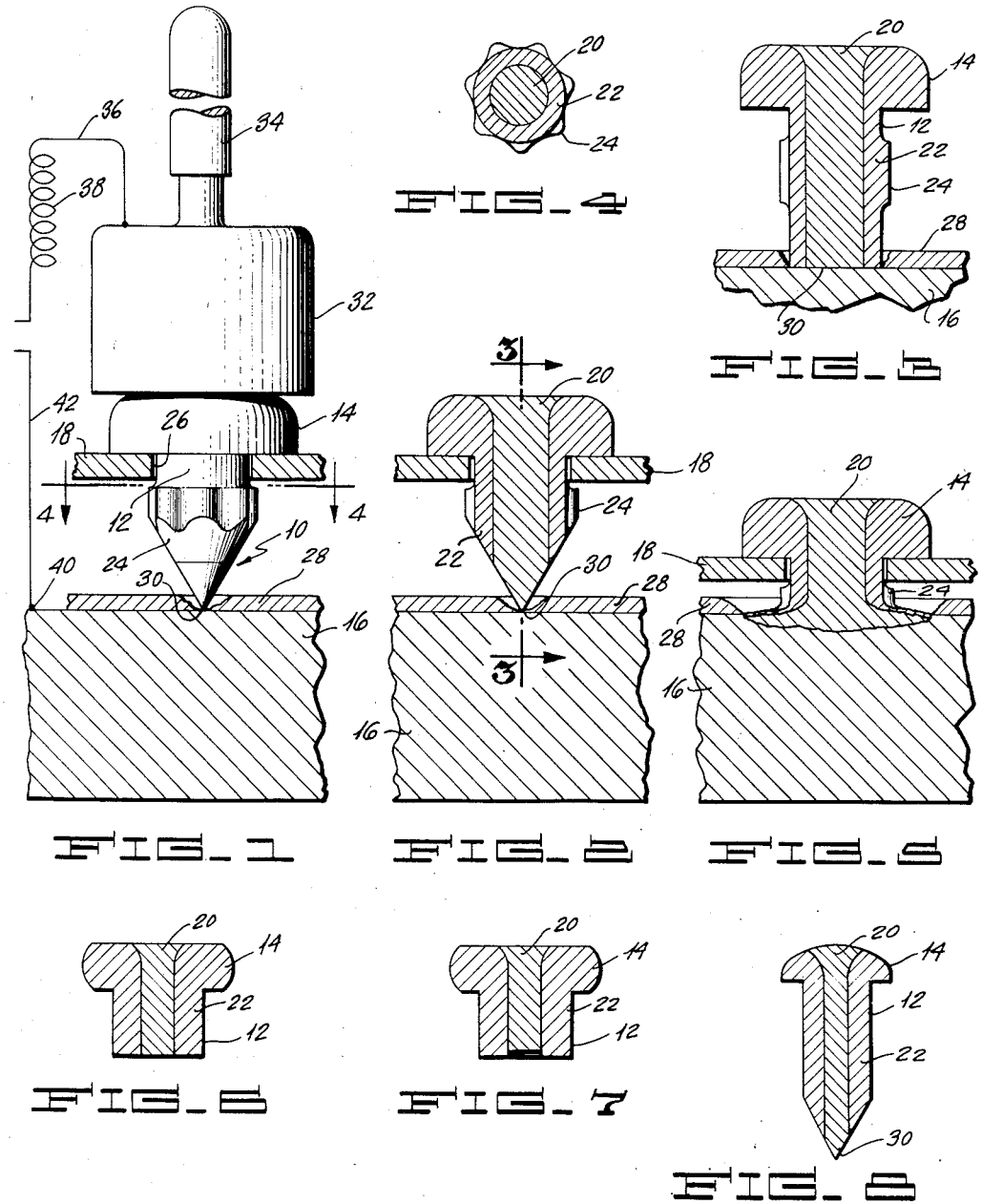
INVENTOR.
HERMAN J. FANGER
BY Naylor and Lassagne
ATTORNEYS Patented Aug. 7, 1951

2,563,107

UNITED STATES PATENT OFFICE 2,563,107

METHOD OF FORMING A WELDED CONNECTION AND MEANS THEREFOR

Herman J. Fanger, Los Gatos, Calif.

Application November 30, 1949, Serial No. 130,182

8 Claims. (Cl. 219—10)

This invention relates to attachment methods and attachment means, and more particularly to a method of forming a welded connection, and means whereby said method may be practiced.

This application is a continuation-in-part of application Serial Number 602,279, filed June 29, 1945, and now abandoned.

In one sense, the attachment method of the invention may be considered to be a welding method, and the attachment means a welding or weldable rivet, but this delineating terminology, as will hereinafter clearly appear, is not to be taken in its popular or conventional sense, for the invention departs from conventionally known means and methods for attachment. Thus, while the conventional welding processes involve the interconnection of one member to another through the fusion of interfacial portions of said members, the instant method is concerned with the interconnection of one member to another through an intermediary or attachment member, which attachment member is provided at one end with a fusion connection to the face of one of the members to be interconnected and its other end with an enlarged head portion adapted to retain the second member of the interconnected pair in engagement with the other member of the pair. From this it will likewise be seen that the attachment member proper, or the weldable rivet so-called, differs essentially from the conventional rivet in that the latter extends through both of the structural members to be attached and is then upset to lock said members together, while the weldable rivet of the invention extends through one of the members and is in resistance welded engagement with the inner face of the other.

In summary, the attachment member of the invention has the general appearance of a rivet in that it is provided with a shank portion and a head portion, but said portions are bimetallic in nature, being provided with core portions of a metal of relatively high electrical conductivity and sheath portions of a metal of relatively high strength and low electrical conductivity, said sheath and core portions being so relatively proportioned as to diametral dimensions, or cross-sectional area, in relation to the comparative electrical conductivity or resistivity values of the metals involved, that upon the transmission, from an electrode pressingly applied to the head portion of the attachment member, of an electric current of predetermined density, the core portion will transmit the current for its full length, which is slightly foreshortened with respect to the length of the sheath portion, whereupon the current will be directed through the tip of the sheath portion to cause the same to overheat, due to its relatively high resistance to the passage of the current, and fuse to the base member in contact therewith. The fusion attachment is thus achieved at the face surface of a base member to which another member, through which extends the attachment member, is to be secured. In effect, therefore, the attachment member serves for the greater part of its length as a structurally strong extension member for the electrode, enabling the transmission of the welding current from the electrode to the lower end, or tip, of the sheath, or weldable portion, of the member constituting the welding locus. The method of attachment of the invention may therefore be said to comprise the utilization of a rigid electrical conduit for the purpose of passing a welding current from an electrode to a welding locus consisting of weldable metal forming a portion of the remote end of said conduit and a base member, and utilizing said conduit, so secured in place, as a form of fairly high strength bolt or stud to secure another member to said base member. The attachment member of the invention comprises the means whereby this method may be practiced. The term "attachment member" is intended to include rivets, studs, with or without a head, with or without threads, and, in general, is intended to embrace any such articles, the lower ends of which are weldable.

Various objects and advantages of the method and means of the invention will appear from the following description taken in conjunction with the drawing forming part of this specification, and in which:

Figure 1 is a view in elevation of a form of the attachment member of the invention, shown before attachment, in relation to the electrode system used;

Figure 2 is a view in diametral section of the attachment member of Figure 1;

Figure 3 is a view in section taken along lines 3—3 of Figure 2;

Figure 4 is a view in section of the attachment member taken along lines 4—4 of Figure 1;

Figure 5 is a view in section of the attachment member showing the same after a welding current has been passed through it;

Figure 6 is a view in axial section of a modified form of the attachment member of the invention;

Figure 7 is a view in axial section of another modified form of the attachment member; and Figure 8 is a view of the type of Figures 6 and 7 of still another modification of the attachment member.

While the method and means of the invention has many uses, they will be hereinafter described in connection with one of the more obvious environments of use to which they are adapted, namely, the affixing of name plates, marker devices, and the like, to the walls or metallic surfaces of machines, pipes or other articles requiring tagging for permanent identification. In conventional practice, such name plates are provided with suitable perforations therethrough, and they are attached to a machine, or the like, by means of screws or studs extending through the plate perforations and into suitable holes which have been drilled in carefully spaced locations in the wall or body of the machine. A relatively large amount of time is required in affixing a name plate in this manner, and in those cases where the base member or machine is subject to vibration, special locking means must be embodied in the name plate assembly to prevent the working loose of the screws or studs. Much time and labor may be saved by utilizing for such purpose the attachment method and means of the present invention.

Referring to the drawing, an attachment member indicated generally at 10 having a shank 12 and an enlarged head 14 is shown in end-abutting relation with a metallic base member 16 constituting, for example, the wall of a machine to which a name plate 18 is to be attached. As indicated in Figures 2–5, the member 10 is provided with core and sheath portions 20 and 22 of dissimilar metals, said core portion 20 consisting of a metal or metal alloy, such as copper, having a relatively high coefficient of electrical conductivity, and the sheath portion 22 consisting of a metal or metal alloy, such as Monel metal, ferrous metal, or other metal or alloy which is both structurally strong and weldable to the particular metal of the base member 16 and has a sufficient electrical conductivity gradient with respect to the metal of the core portion 20.

The attachment member 10 of Figures 1–5 is provided with means for securing the member, or members, there being at least two used with the conventional name plate 18, in relation to the name plate before the member 10 is positively secured to the base member 16, said means comprising, for example, the radially spaced ribs 24 on the sheath portion 22 of the shank 12. When the shanks of the members 10 are pressingly inserted through the apertures 26 of the name plate, the ribs 24 prevent casual or accidental withdrawal of the members 10 from the name plate, and thus the name plate and attachment member assembly may be handled as an integral unit, allowing one-hand positioning of the same against the base member 16 for the ensuing operation of the welding electrode.

The embodiment of Figures 1–5 is also provided with means enabling the ready usage of the attachment member when the base member 16 is provided with a surface coating 28 of paint, or like non-conductive material, said means comprising the chisel point end 30 for the shank 12. As indicated in Figure 3 the core and sheath portions 20 and 22 are co-terminous at the chisel point end of the attachment member. When the name plate 18 and attachment members 10 carried thereby are positioned for the attachment process, the chisel point ends of the members break through the paint coating 28 and establish electrical contact with the base member 16 upon the pressing application to the heads 14 of the members of the block electrode 32, preparatory to the transmission of the welding current through the attachment members by the electrical system now to be described.

The electrical system used to form the weld connection between the member 10 and the base member 16 to thereby secure the name plate 18 to the member 16 comprises the block electrode 32 of hard copper alloy, provided with a handle 34 permitting of manual use of the same, said electrode being connected through lead 36, including a resistance 38 of appropriate value, to one side of a source of heavy electric current, not shown. The other side of the current source is grounded to the base member, as at 40, through lead 42. Conventional switch means, not shown, are provided for the triggering of the electrode circuit.

In order to weldingly secure the member 10 to the base member 16, the switch means for the electrode circuit is closed while manual pressure is applied to the electrode 32. Momentary current flow through the member 10 to the base member results in the welded connection illustrated in Figure 5. The tip of the shank 12 is mushroomed by the combination of heat and pressure, while the body of the shank is compressed and thereby thickened or widened. The compacting of the shank provides for a greater areal contact between the weldable metal of the sheath 22 and the base member 16, and the welded connection is constituted by the low electrical conductivity portion of the member 10, with the core 20, or high electrical conductivity portion, serving as the conductor to transmit the current from the electrode 32 to the tip of the sheath 22. The passage of the current through the tip of the sheath to the base member causes a sufficient instantaneous heating of the sheath tip to fuse or weld the same to the member 16.

The main body of the sheath above the extreme tip portion remains relatively cool during the welding, being progressively lower in temperature in the direction of the head 14, since any heating up of the main body of the sheath is caused by conduction from the tip, or portion through which the current flow takes place. Thus, the core, or high conductivity portion 20, serves, in effect, as an extension of the electrode, in that it enables the welding current to be passed into and through the tip of the sheath 22, while by-passing the main body thereof and thereby avoiding overheating of the same. Since the main body of the attachment member 10 remains relatively cool during the application of the welding current, the method and means of attachment of the invention may be used with name plates of materials which are normally subject to charring, deformation, etc. at relatively low temperatures. For example, plastic or fiber name plates may be used, since the surface temperature of the head approximately one second after the passage of the current through the member is not in excess of 150° C.

Figures 6, 7 and 8 illustrate modified forms of the attachment member, with those parts corresponding to parts of the embodiment of Figures 1–5 being designated by the same reference numerals. The attachment member of Figure 6 is provided with a blunt lower end, and it will be noted that the core and sheath portions 20 and 22 are co-terminous at the lower end of the member. This form of the member is efficiently operable when applied to non-painted base members, and the welding effect is substantially the same as that above-described in connection with the chisel point attachment member of Figures 1-5, although the blunt ended member of Figure 6 is perhaps conducive to a slightly better weld connection due to the greater areal contact between the end of the sheath portion 22 and the base member.

The modification of the attachment member of Figure 7 differs from that of Figure 6 in that the lower end of the core portion 20 terminates short of the lower end of the sheath portion. This attachment member is productive of a highly efficient weld which, for reasons which will hereinafter appear, may be produced with a lesser welding current load than that required for the other forms of the attachment member.

The modification of Figure 8 shows a variation of the chisel point form previously described. The structure of Figure 8 may be very conveniently formed by drawing copper wire through a wire drawing machine to form the core, followed by the coating of the desirable sheath metal, such as Monel, thereon, and then by treating the composite in a nail making machine to cut, upset and shear, thereby forming the member.

The modification of the member shown in Figure 7 will best serve to illustrate what is considered to be the theory of operation of the attachment member. Current transmitted to the member from the electrode 32 travels the length of the core 22 and is then forced to pass through the overlapping end portion of the sheath, which portion constitutes in effect a high resistance bridge between the core 20 and the base member 16. In passing through this lower portion of the sheath the current heats said portion to a sufficiently high temperature to fuse or weld the same to the base member.

The same mechanism of operation occurs in connection with the other modifications of the attachment member in which the core and sheath portions terminate at the same level. Taking the member of Figure 7 as an example and assuming that the relative cross-section areal proportions of the core and sheath portions are such as to enable the obtaining of a good weld, the current density in relation to the conductivity or current carrying capacity of the core should be such that the lower end of the core is dissipated or disintegrated by the heat caused by the passage of the current to convert the member to the form of that of Figure 7, i. e., in which the sheath portion extends beneath the core portion. This produces the resistance bridge of weldable material, abovementioned, through which the current passes to the base member. If the current-carrying area of the core is greater in relation to the current density than that just mentioned, the core tip will not overheat, but will remain in solid form, and the core will transmit the current directly to the base member, and thus the sheath tip will not adequately weld. Substantiation of this relationship between the current-carrying area of the core and the current density is presented by the consideration that when the welding current is passed through a bare core of large area in relation to the current density, the core remains unchanged, whereas, if the same current is passed through a bare core having an area within the desired range in relation to the current density, the core disintegrates, i. e., fuses and splatters. Thus, the sheaths of the attachment members serve as retaining jackets for the cores while the ends of the latter are changed in form to cause the welding current to pass through the tips of the sheath portions.

In this connection, it is to be pointed out that an attachment member comprised solely of the sheath metal will disintegrate under the action of a current of welding magnitude.

While the core portions of the members are preferably of copper or high copper alloy, the sheath portions may be of Monel, ferrous metal, such as electrolytic iron, or other metal or alloy which is weldable to a ferrous metal base member. If the base member is of a metal other than ferrous, an appropriate metal weldable therewith may be used in connection with a high conductivity core. For example, an attachment member having an aluminum sheath and a silver core produces a good weld on an aluminum base member.

For the purpose of use with name plates, the attachment members have been generally made with overall diameters of approximately ⅛ inch and in lengths from $\frac{1}{16}$ inch to ¼ inch. A good weld with a heavy current source of approximately 3 kilowatts is produced when the relative diametral dimensions of the ⅛ inch shank are approximately $\frac{1}{32}$ inch of copper for the core and $\frac{3}{32}$ inch of Monel, or nickel, or iron, for the sheath. These ratios provided extremely good welds in test runs up to one inch lengths. On the other hand, for ⅛ inch diameter specimens in which the sheath portion of the overall diameter was reduced to approximately 1/100 inch, the resulting weld was not very strong. When the sheath thickness was increased in relation to the core diameter so that the relative proportions of cross-sectional areas went below ⅖ copper and above ⅗ Monel, the quality of the weld fell off. The satisfactory cross sectional areal range for the production of an adequate weld with the copper-Monel combination could be said to be from ⅘ copper and ⅕ Monel to ⅖ copper and ⅗ Monel. Substantially the same ratios are required in a copper-iron or copper-nickel combination, and also with the silver-aluminum combination, abovementioned, which provides a satisfactory weld with an aluminum base member with a heavy current source of approximately five kilowatts.

From the foregoing it will be seen that I have provided a novel attachment method and means therefor serving as a structural attachment member, and since it will be clear to those skilled in the art to which these inventions appertain that certain changes and modifications therein may be made without departing from the spirit of the invention, it is to be understood that the scope of the invention is to be limited only by the scope of the appended claims.

What I claim as new and desire to secure as Letters Patent is:

1. A method of attachment adapted for the securing of a first member having an aperture therethrough to a second member having a metallic surface comprising providing an attachment member in the form of a rivet, having a head portion of larger diameter than the aperture of said first member, comprising a metal of high electrical conductivity, permanently securing at the end of the shank portion of said rivet a shell of metal of relatively low thermal conductivity fusible by means of resistance welding to the metallic surface of said second member, inserting said attachment member shank-wise through the aperture of said first member into engagement with the metallic surface of said second member, pressingly applying a welding current electrode to the head of said rivet, and passing through said rivet a momentary electric current of sufficient magnitude to fuse said shell metal to said second member.

2. A method of attachment adapted for the securing of a first member having an aperture therethrough to a second member having a metallic surface comprising the steps of so forming a bimetallic rivet with head and shank portions that a core portion of a metal of high electrical conductivity is sheathed for at least the length of the shank portion in a metal of high strength and low electrical conductivity fusible by means of resistance welding to the metallic surface of said second member, inserting said rivet shankwise through the aperture of said first member into engagement with the metallic surface of said second member, pressingly applying a welding current electrode to the head of said rivet, and passing through said rivet a momentary electric current of sufficient magnitude to fuse the end of said sheath metal to said second member.

3. A method of attachment adapted for the securing of a first member having an aperture therethrough to a second member having a metallic surface covered with a thin electrically non-conductive material, such as paint, comprising the steps of so forming a bimetallic rivet with head and shank portions that a core portion of a metal of high electrical conductivity is sheathed for at least the length of the shank portion in a metal of relatively high strength and low electrical conductivity fusible by means of resistance welding to the metallic surface of said second member, forming the end of said shank into a sharply defined projection, inserting said rivet shankwise through the aperture of said first member into engagement with the non-conductive material on the metallic surface of said second member, pressingly applying a welding current electrode against the head of said rivet to cause said sharply defined projection to pierce said non-conductive material and establish contact with said metallic surface, and passing through said rivet a momentary electric current of sufficient magnitude to fuse the end of said sheath metal to the metallic surface of said second member while maintaining electrode pressure against said rivet.

4. A method of attachment whereby a first member having an aperture therethrough may be secured to a second member having a metallic surface comprising an attachment member in the general form of a rivet having the following characteristics: core and sheath portions of dissimilar metals; one of said portions being of a first metal of relatively high strength weldable by means of resistance welding to the metallic surface of said second member, said first metal extending for at least the full length of the shank of said attachment member to impart strength thereto; the other of said portions being of a second metal of relatively high electrical conductivity in relation to the electrical conductivity of said first metal, said second metal extending from the upper surface of said attachment member for at least substantially the full length thereof; and said core and sheath metals being so proportioned as to relative thickness that the resultant electric current resistivity values of said metals enables the passage through said attachment member of an electric current of sufficient magnitude to weld the end of said first metal portion to the surface of said second member; inserting said attachment member shank-wise through the aperture of said first member into engagement with the surface of said second member, pressingly applying a welding current electrode to the head of said attachment member, and passing a momentary electric current of said sufficient magnitude through said attachment member while maintaining electrode pressure against the head of said attachment member.

5. A method of attachment adapted for the securing of a first member having an aperture therethrough to a second member having a metallic surface comprising providing an attachment member in the general form of a rivet having the following characteristics: core and sheath portions of dissimilar metals; said sheath portions being of a first metal of relatively high strength weldable by means of resistance welding to the metallic surface of said second member, said first metal extending for at least the full length of the shank of said attachment member to impart strength thereto; the core portion being of a second metal of relatively high electrical conductivity in relation to the electrical conductivity of said first metal, said second metal extending from the upper surface of said attachment member for at least substantially the full length thereof; and said core and sheath metals being so proportioned as to relative thickness that the resultant electric current resistivity values of said metals enables the passage through said attachment member of an electric current of sufficient magnitude to weld the end of said first metal portion to the surface of said second member; inserting said attachment member shankwise through the aperture of said first member into engagement with the surface of said second member, pressingly applying a welding current electrode to the head of said attachment member, and passing a momentary electric current of said sufficient magnitude through said attachment member while maintaining electrode pressure against the head of said attachment member.

6. A method of attachment adapted for the securing of a first member having an aperture therethrough to a second member having a metallic surface covered with a thin electrically nonconductive material, such as paint, comprising providing an attachment member in the general form of a rivet having the following characteristics: core and sheath portions of dissimilar metals; said sheath portion being of a first metal of relatively high strength weldable by means of resistance welding to the metallic surface of said second member, said first metal extending for at least the full length of the shank of said attachment member to impart strength thereto; the core portion being of a second metal of relatively high electrical conductivity in relation to the electrical conductivity of said first metal, said second metal extending from the upper surface of said attachment member for at least substantially the full length thereof; said attachment member having the lower end of its shank formed into a sharply defined edge; and said core and sheath metals being so proportioned as to relative thickness that the resultant electric current resistivity values of said metals enables the passage through said attachment member of an electric current of sufficient magnitude to weld the end of said first metal portion to the surface of said second member; inserting said attachment member shankwise through the aperture of said first member into engagement with the non-conductive material on the metallic surface of said second member, pressingly applying a welding current electrode against the head of said attachment member to cause said sharply defined edge to pierce said non-conductive material and establish contact with said metallic surface, and passing through said attachment member a momentary electric current of said sufficient magnitude while maintaining electrode pressure against the head of said attachment member.

7. An electrode welding method for the fusing of a metallic stud-like member to a metallic base member comprising forming said stud-like member with a core portion of high electrical conductivity extending from the electrode surface of said stud-like member to the fusion end thereof, and further forming said stud-like member with a sheath portion of a metal of relatively high strength which is weldable to said metallic base member, bringing the fusion end of said stud-like member into engagement with said base member, and passing a current of sufficient intensity through said stud-like member to enable the welding of said member to said base member.

8. An electrode welding method for the fusion of a metallic stud-like member to a metallic base member comprising forming said stud-like member with an external or sheath portion of metal weldable to said base member, further forming said stud-like member with an internal or core portion of a metal of higher electrical conductivity than the metal of said sheath portion, said core portion extending from the upper end to the lower end of said stud-like member and being adapted to serve as an in situ extension for the electrode to be engaged with the upper end of said member, bringing the lower end of said member into engagement with said base member, and passing a current of sufficient intensity into the upper end of said member and through said member to enable the fusion of the lower end of said member to said base member.

HERMAN J. FANGER.

REFERENCES CITED

The following references are of record in the file of this patent:

UNITED STATES PATENTS

| Number | Name | Date |
|---|---|---|
| 1,366,108 | Wobig | Jan. 18, 1921 |
| 2,008,786 | Febrey | July 23, 1935 |
| 2,127,685 | Greulich | Aug. 23, 1938 |
| 2,137,097 | Sateren | Nov. 15, 1938 |
| 2,327,924 | Mounts | Aug. 24, 1943 |